US012687868B2

(12) United States Patent
Shao et al.

(10) Patent No.: US 12,687,868 B2
(45) Date of Patent: Jul. 21, 2026

(54) SMART GAS ADAPTIVE PRESSURE REGULATION METHOD BASED ON CALORIFIC VALUE OF GAS AND INTERNET OF THINGS SYSTEM

(71) Applicant: CHENGDU QINCHUAN IOT TECHNOLOGY CO., LTD., Chengdu (CN)

(72) Inventors: Zehua Shao, Chengdu (CN); Yong Li, Chengdu (CN); Yuefei Wu, Chengdu (CN); Bin Liu, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 71 days.

(21) Appl. No.: 18/901,132

(22) Filed: Sep. 30, 2024

(65) Prior Publication Data

US 2025/0021115 A1     Jan. 16, 2025

Related U.S. Application Data

(63) Continuation of application No. PCT/CN2022/144061, filed on Dec. 30, 2022.

(51) Int. Cl.
|   |   |
|---|---|
| *G05D 16/20* | (2006.01) |
| *F17D 3/01* | (2006.01) |
(Continued)

(52) U.S. Cl.
CPC ........... G05D 16/2006 (2013.01); F17D 3/01 (2013.01); G06Q 50/06 (2013.01); H04L 67/12 (2013.01)

(58) Field of Classification Search
CPC ...... G05D 16/2006; F17D 3/01; G06Q 50/06; H04L 67/12
(Continued)

(56) References Cited

U.S. PATENT DOCUMENTS

| 2023/0070989 A1 | 3/2023 | Shao et al. |
| 2023/0111440 A1 | 4/2023 | Shao et al. |
(Continued)

FOREIGN PATENT DOCUMENTS

| CN | 211083638 U | 7/2020 |
| CN | 212691497 U | 3/2021 |
(Continued)

OTHER PUBLICATIONS

International Search Report in PCT/CN2022/144061 mailed on Sep. 1, 2023, 8 pages.
(Continued)

*Primary Examiner* — Minh Q Le
(74) *Attorney, Agent, or Firm* — METIS IP LLC

(57) ABSTRACT

A method and an Internet of Things system for smart gas adaptive pressure regulation based on a calorific value of gas are provided. The method comprises: acquiring calorific value of gas data, wherein the calorific value of gas data is acquired on the basis of a pressure regulation station; acquiring a first pressure regulation parameter of the pressure regulation station, wherein the first pressure regulation parameter is used for reflecting current pressure regulation data of the pressure regulation station; determining whether the calorific value of gas data meets a first preset condition; in response to the calorific value of gas data not meeting the first preset condition, adjusting the first pressure regulation parameter; and determining a second voltage regulation parameter of the pressure regulation station on the basis of the adjusted first voltage regulation parameter, wherein the
(Continued)

200 second voltage regulation parameter is updated pressure regulation data.

9 Claims, 6 Drawing Sheets

(51) Int. Cl.
*G06Q 50/06*          (2012.01)
*H04L 67/12*          (2022.01)
(58) Field of Classification Search
USPC .......................................... 137/14, 487.5, 7
See application file for complete search history.

(56) References Cited

U.S. PATENT DOCUMENTS

| | | | | | |
|---|---|---|---|---|---|
| 2023/0125033 | A1* | 4/2023 | Shao | ............... | G06Q 10/06312 |
| | | | | | 705/7.22 |
| 2023/0167950 | A1* | 6/2023 | Shao | ....................... | F17D 5/005 |
| | | | | | 137/1 |
| 2023/0204163 | A1* | 6/2023 | Shao | ........................ | F17D 1/20 |
| | | | | | 137/455 |
| 2023/0280264 | A1* | 9/2023 | Shao | ........................ | F17D 5/00 |
| | | | | | 205/775.5 |
| 2023/0328139 | A1* | 10/2023 | Shao | ....................... | G16Y 10/35 |
| | | | | | 702/188 |
| 2024/0134437 | A1* | 4/2024 | Shao | .................... | G08B 21/182 |
| 2024/0142944 | A1* | 5/2024 | Shao | ........................ | G01F 1/666 |
| 2024/0201156 | A1* | 6/2024 | Shao | ................. | G01N 33/0063 |
| 2024/0201710 | A1* | 6/2024 | Shao | ..................... | G05D 7/0623 |
| 2024/0242232 | A1* | 7/2024 | Shao | ....................... | G06Q 50/26 |
| 2024/0249374 | A1* | 7/2024 | Shao | ..................... | G06Q 50/265 |
| 2024/0271762 | A1* | 8/2024 | Shao | ....................... | F17D 5/005 |
| 2024/0330872 | A1* | 10/2024 | Shao | ..................... | G16Y 40/50 |
| 2025/0232390 | A1* | 7/2025 | Shao | .................... | G06Q 30/018 |
| 2026/0024059 | A1* | 1/2026 | Shao | ..................... | G06Q 10/20 |
| 2026/0025430 | A1* | 1/2026 | Shao | ...................... | G06Q 50/06 |

FOREIGN PATENT DOCUMENTS

| | | | |
|---|---|---|---|
| CN | 113074323 | A | 7/2021 |
| CN | 216143572 | U | 3/2022 |
| CN | 217030831 | U | 7/2022 |
| KR | 20190059121 | A | 5/2019 |
| WO | 2016052811 | A1 | 4/2016 |

OTHER PUBLICATIONS

Written Opinion in PCT/CN2022/144061 mailed on Sep. 1, 2023, 6 pages.

* cited by examiner

100

200

<u>300</u>

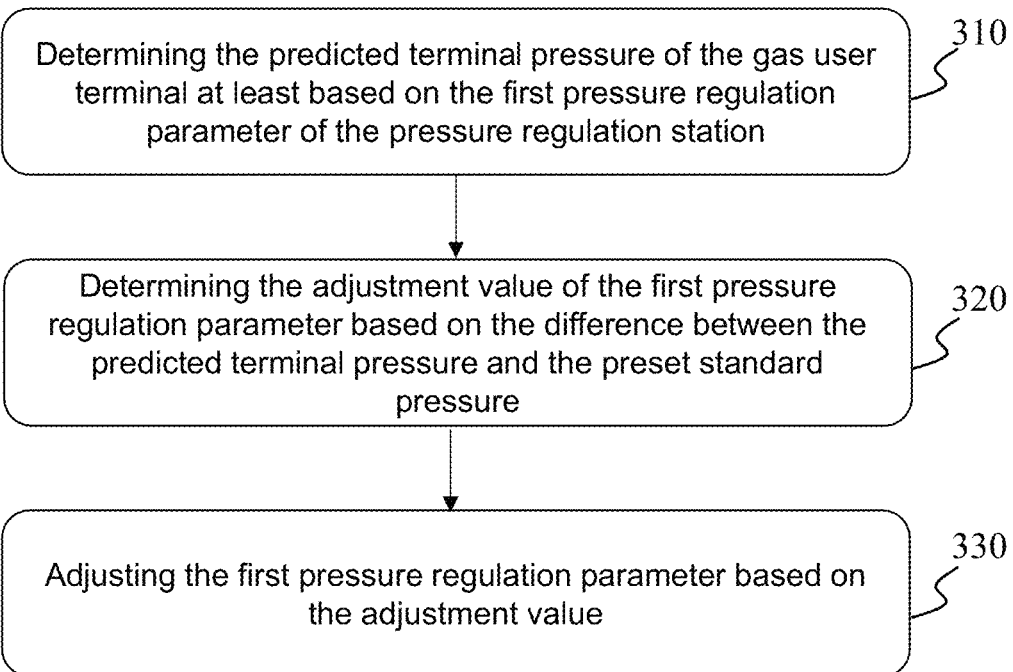

Determining the predicted terminal pressure of the gas user terminal at least based on the first pressure regulation parameter of the pressure regulation station — 310

Determining the adjustment value of the first pressure regulation parameter based on the difference between the predicted terminal pressure and the preset standard pressure — 320

Adjusting the first pressure regulation parameter based on the adjustment value — 330

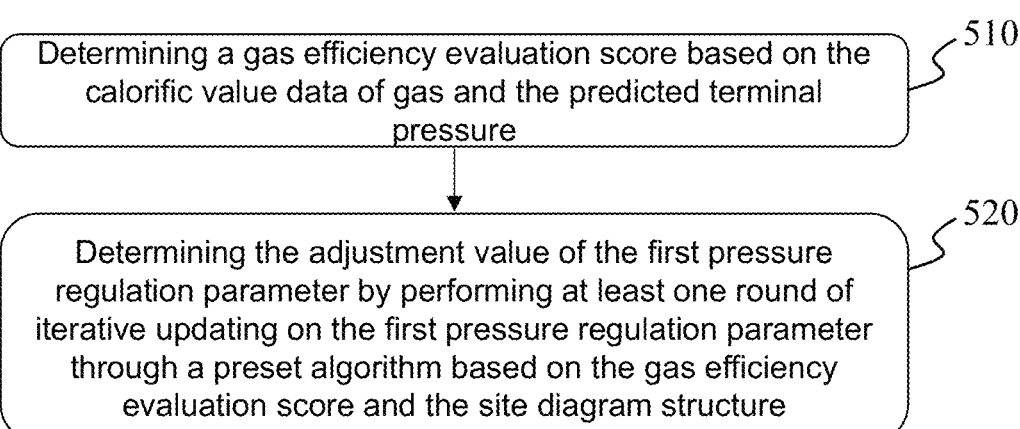

510

Determining a gas efficiency evaluation score based on the calorific value data of gas and the predicted terminal pressure

520

Determining the adjustment value of the first pressure regulation parameter by performing at least one round of iterative updating on the first pressure regulation parameter through a preset algorithm based on the gas efficiency evaluation score and the site diagram structure

SMART GAS ADAPTIVE PRESSURE REGULATION METHOD BASED ON CALORIFIC VALUE OF GAS AND INTERNET OF THINGS SYSTEM

CROSS-REFERENCE TO RELATED APPLICATIONS

This application is a Continuation of International Application No. PCT/CN2022/144061, filed on Dec. 30, 2022, the entire contents of which are incorporated herein by reference.

TECHNICAL FIELD

This specification relates to the field of gas control, in particular to a smart gas adaptive pressure regulation method based on a calorific value of gas and an Internet of Things system.

BACKGROUND

No matter in industrial production or residential gas supply system, the change of the pressure, flow and calorific value outputted by the gas supply system caused by the change of the calorific value of gas source, gas load and other factors may have a certain impact on the residential gas, commercial gas and industrial gas use. For example, under the same gas pressure, when the calorific value of gas is high, the gas use efficiency is high, and when the calorific value of gas is low, the gas use efficiency may decrease, which is inconvenient for the stable gas use of residents' life and commercial and industrial production.

Therefore, it is desirable to provide a smart gas adaptive pressure regulation method based on the calorific value of gas and an Internet of Things system, which may obtain the change of the calorific value data of gas, and control the pressure regulation station to control the gas use efficiency to stabilize at a level by adjusting the gas pressure when the change satisfies the preset condition (such as greater than the threshold), so as to satisfy the user needs.

SUMMARY

One or more embodiments of this disclosure provide a smart gas adaptive pressure regulation method based on a calorific value of gas, performed by a smart gas equipment management platform of an Internet of Things system for smart gas adaptive pressure regulation based on a calorific value of gas, comprising: obtaining calorific value data of gas, the calorific value data of gas being obtained based on a pressure regulation station; obtaining a first pressure regulation parameter of the pressure regulation station, the first pressure regulation parameter being used to reflect current pressure regulation data of the pressure regulation station; determining whether the calorific value data of gas satisfies a first preset condition; in response to the calorific value data of gas not satisfying the first preset condition, adjusting the first pressure regulation parameter; and determining a second pressure regulation parameter of the pressure regulation station based on the adjusted first pressure regulation parameter, the second pressure regulation parameter being the updated pressure regulation data.

One of the embodiments of this disclosure provides an Internet of Things system for smart gas adaptive pressure regulation, comprising: a smart gas user platform, a smart gas service platform, a smart gas equipment management platform, a smart gas sensor network platform, and a smart gas object platform; the smart gas object platform is configured to obtain calorific value data of gas and a first pressure regulation parameter of a pressure regulation station, and transmit the calorific value data of gas and the first pressure regulation parameter of the pressure regulation station to the smart gas equipment management platform through the smart gas sensor network platform; the first pressure regulation parameter is configured to reflect current pressure regulation data of the pressure regulation station; the smart gas equipment management platform is configured to: in response to the calorific value data of gas not satisfying the first preset condition, adjust the first pressure regulation parameter; determine a second pressure regulation parameter of the pressure regulation station based on the adjusted first pressure regulation parameter, the second pressure regulation parameter being updated pressure regulation data; send the updated pressure regulation data to the smart gas service platform; and the smart gas service platform is configured to send the updated pressure regulation data to the smart gas user platform.

One or more embodiments of this disclosure provide a non-transitory computer readable storage medium, wherein the storage medium stores computer instructions, and when the computer reads the computer instructions in the storage medium, the computer executes the smart gas adaptive pressure regulation method based on the calorific value of gas.

BRIEF DESCRIPTION OF THE DRAWINGS

The present disclosure may be further described by way of exemplary embodiments, which may be described in detail with reference to the accompanying drawings. These embodiments are not limiting, and in these embodiments, the same numbers refer to the same structures.

FIG. 3 is an exemplary schematic diagram of adjusting the first pressure regulation parameter according to some embodiments of the present disclosure;

FIG. 5 is an exemplary schematic diagram of determining the adjustment value of the first pressure regulation parameter according to some embodiments of the present disclosure;

DETAILED DESCRIPTION

Figure 1:
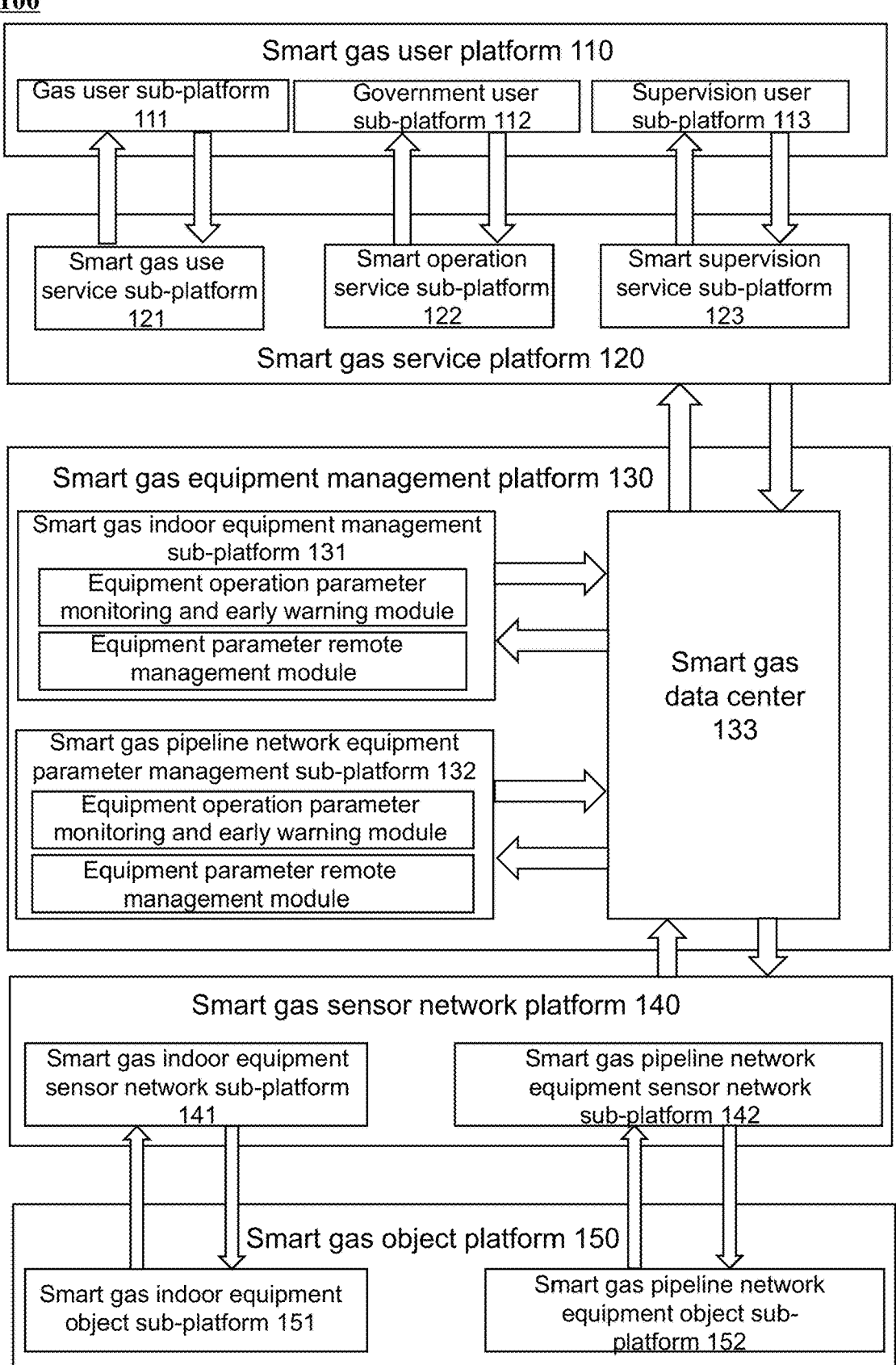
FIG. 1 is a schematic diagram of the Internet of Things system for smart gas adaptive pressure regulation according to some embodiments of the present disclosure.

In order to illustrate the technical solutions of the embodiments of the present disclosure more clearly, the following briefly introduces the accompanying drawings used in the description of the embodiments. Obviously, the accompanying drawings in the following description are only some examples or embodiments of the present disclosure. For ordinary technicians skilled in the art, without creative efforts, the present disclosure may also be applied to other similar situations according to these accompanying drawings. Unless obvious from the locale or otherwise specified, the same reference numbers in the drawings represent the same structure or operation.

It is to be understood that "system", "device", "unit" and/or "module" as used herein is a method used to distinguish different components, elements, parts, sections or assemblies at different levels. However, other words may be replaced by other expressions if they serve the same purpose.

As shown in the disclosure and claims, unless the context clearly dictates otherwise, the words "a", "an", and/or "the" are not intended to be specific in the singular form but may include the plural form. In general, the terms "comprising" and "including" only imply that the clearly identified steps and elements are included, and these steps and elements do not constitute an exclusive list, and the method or equipment may also include other steps or elements.

Flowcharts are used in this disclosure to illustrate operations performed by the system according to the embodiments of this disclosure. It should be understood that the preceding or following operations are not necessarily performed in the exact order. Instead, the various steps may be processed in reverse order or simultaneously. At the same time, other operations may be added to these procedures, or a step or steps may be removed from these procedures.

FIG. 1 is a schematic diagram of the Internet of Things system for smart gas adaptive pressure regulation according to some embodiments of the present disclosure.

As shown in FIG. 1, the Internet of Things system for smart gas adaptive pressure regulation 100 comprises a smart gas user platform 110, a smart gas service platform 120, a smart gas equipment management platform 130, a smart gas sensor network platform 140 and a smart gas object platform 150.

The smart gas user platform 110 may be a platform for interacting with a user. The user may be a gas user, a gas safety supervision user, a gas operator, etc. In some embodiments, the smart gas user platform 110 may be configured as terminal equipment, for example, the terminal equipment may comprise mobile equipment, a tablet computer, etc., or any combination thereof. In some embodiments, the smart gas user platform 110 may feed back information to the user through the terminal equipment. For example, the smart gas user platform 110 may feed back operation parameter management information of the gas pressure regulation station to the user through the terminal equipment (e.g., a displayer).

In some embodiments, the smart gas user platform 110 may comprise a gas user sub-platform 111, a government user sub-platform 112, and a supervision user sub-platform 113. In some embodiments, the gas user sub-platform 111 targets the gas user. The gas user may refer to a user who actually use gas, such as a consumer. In some embodiments, the gas user sub-platform 111 may correspond and interact with a smart gas use service sub-platform 121 to obtain a service for safe gas use. In some embodiments, the government user sub-platform 112 may provide data related to gas operation for the government user. In some embodiments, the government user sub-platform 112 may correspond to and interact with a smart operation service sub-platform to obtain a gas operation service. In some embodiments, the supervision user sub-platform 113 may supervise the operation of the entire Internet of Things system for the gas safety supervision user. The supervision user refers to a user of the safety department. In some embodiments, the supervision user sub-platform 113 may correspond to and interact with a smart supervision service sub-platform to obtain a service required by safety supervision.

In some embodiments, the smart gas user platform 110 may interact with the smart gas service platform 120. For example, the smart gas user platform 110 may issue an operation parameter management information query instruction of the gas pressure regulation station to the smart gas service platform 120, and the smart gas user platform 110 may receive the operation parameter management information of the gas pressure regulation station uploaded by the smart gas service platform 120, etc.

The smart gas service platform 120 may be a platform for conveying the user needs and control information. The smart gas service platform 120 connects the smart gas user platform 110 and the smart gas equipment management platform 130. In some embodiments, the updated pressure regulation data may be sent to the smart gas user platform 110 based on the smart gas service platform 120.

In some embodiments, the smart gas service platform 120 may comprise a smart gas use service sub-platform 121, a smart operation service sub-platform 122, and a smart supervision service sub-platform 123. In some embodiments, the smart gas use service sub-platform 121 may correspond to the gas user sub-platform 111 to provide the gas user with information related to gas equipment. In some embodiments, the smart operation service sub-platform 122 may correspond to the government user sub-platform 112 to provide the government user with information related to gas operation. In some embodiments, the smart supervision service sub-platform 123 may correspond to the supervision user sub-platform 113 to provide the supervision user with information related to safety supervision.

In some embodiments, the smart gas service platform 120 may interact with the smart gas equipment management platform 130. For example, the smart gas service platform 120 may issue the operation parameter management information query instruction of the gas pressure regulation station to the smart gas equipment management platform 130, and the smart gas service platform 120 may receive the operation parameter management information query instruction of the gas pressure regulation station uploaded by the smart gas equipment management platform 130.

The smart gas equipment management platform 130 may refer to a platform for planning and coordinating the connection and cooperation between various functional platforms, gathering all the information of the Internet of Things, and providing perception management and control management functions for the Internet of Things operation system. For example, the smart gas equipment management platform 130 may be used to execute the smart gas adaptive pressure regulation method, to process the calorific value data of gas in response to the need of the urban gas adaptive pressure regulation, and to determine the pressure regulation parameter of the pressure regulation station.

In some embodiments, the smart gas equipment management platform 130 may comprise a smart gas indoor equipment management sub-platform 131, a smart gas pipeline network equipment management sub-platform 132 and a smart gas data center 133. Each management sub-platform (such as the smart gas indoor equipment management sub-platform 131 and the smart gas pipeline network equipment management sub-platform 132) is independent of each other. In some embodiments, each management sub-platform interacts with the smart gas data center 133 bidirectionally. The smart gas data center 133 may aggregate and store at least part of the operation data of the system. In some embodiments, the smart gas equipment management platform 130 may perform information interaction with the smart gas service platform 120 and the smart gas sensor network platform 140 through the smart gas data center 133.

In some embodiments, each management sub-platform may comprise an equipment operation parameter monitoring and early warning management module, and an equipment parameter remote management module. In some embodiments, the equipment operation parameter monitoring and early warning management module may view historical data and real-time data of equipment operation parameters, and perform monitoring and early warning according to a preset threshold. In some embodiments, when the equipment operation parameters are abnormal, the administrator may directly switch from the equipment operation parameter monitoring and early warning module to the equipment parameter remote management module to perform remote processing of the equipment parameters, and initiate reminder information to the user through the smart gas service platform 120 if necessary. In some embodiments, the device parameter remote management module may remotely set and adjust the equipment parameters of the smart gas object platform 150, and remotely authorize the equipment parameter adjustment initiated by the smart gas object platform 150 on site.

In some embodiments, the information interaction between the smart gas equipment management platform 130 and the upper smart gas service platform 120 and the lower sensor network platform 140 all passes through the smart gas data center 133. In some embodiments, the smart gas equipment management platform 130 may receive the operation parameter management information query instruction of the gas pressure regulation station issued by the smart gas service platform 120 through the smart gas data center 133. In some embodiments, the smart gas equipment management platform 130 may issue an instruction to obtain data related to the operation of the gas pressure regulation station to the smart gas sensor network platform 140 through the smart gas data center 133.

In some embodiments, the smart gas equipment management platform 130 may receive the data related to the operation of the gas pressure regulation station uploaded by the smart gas sensor network platform 140 through the smart gas data center 133. The related data comprises monitoring information of the smart gas object platform 150, and the monitoring information may comprise gas composition information (e.g., content of methane, methane, nitrogen, carbon dioxide, etc.), monitoring and measurement of operation data such as gas temperature and pressure, and the like.

In some embodiments, the smart gas data center 133 sends the data related to the operation of the gas pressure regulation station to the smart gas pipeline network equipment parameter management sub-platform 132 for analysis and processing. In some embodiments, the smart gas pipeline network equipment parameter management sub-platform 132 sends the analyzed and processed data to the smart gas data center 133. In some embodiments, the smart gas data center 133 may send the aggregated and processed data to the smart gas service platform 120. The processed data comprises operation information of the gas pressure regulation station, and the operation information of the gas pressure regulation station may comprise operation parameters of the gas pressure regulation station and the like.

The smart gas sensor network platform 140 may be a functional platform for managing sensor communication. In some embodiments, the smart gas sensor network platform 140 may connect the smart gas equipment management platform 130 and the smart gas object platform 150 to realize the functions of perception information sensor communication and control information sensor communication.

In some embodiments, the smart gas sensor network platform 140 may comprise a smart gas indoor equipment sensor network sub-platform 141 and a smart gas pipeline network equipment sensor network sub-platform 142. In some embodiments, the smart gas indoor equipment sensor network sub-platform 141 may correspond to the smart gas indoor equipment object sub-platform 151, and is used to obtain relevant data of indoor equipment. In some embodiments, the smart gas pipeline network equipment sensor network sub-platform 142 may correspond to the smart gas pipeline network equipment object sub-platform 152, and is used to obtain relevant data of pipeline network equipment.

In some embodiments, the smart gas sensor network platform 140 may interact with the smart gas object platform 150. For example, the smart gas sensor network platform 140 may receive relevant data about the operation of each gas pressure regulation station uploaded by the smart gas object platform 150; as another example, the smart gas sensor network platform 140 may issue an instruction on the relevant data of the operation of the gas pressure regulation station to the smart gas object platform 150. In some embodiments, the smart gas sensor network platform 140 may interact with the smart gas management platform 130.

The smart gas object platform 150 may be a functional platform for perception information generation. In some embodiments, the smart gas object platform 150 may be configured to comprise at least one gas equipment. The gas equipment is equipped with a unique identifier, which may be used to control the gas equipment deployed in different areas of the city; the gas equipment may also comprise indoor equipment and pipeline network equipment. For example, the pipeline network equipment may be the gas pressure regulation station (such as a main pressure regulator, an auxiliary pressure regulator), a gas flow meter, valve control equipment, a thermometer, a barometer, and the like. In some embodiments, the smart gas object platform 150 is configured to obtain the calorific value data of gas and the first pressure regulation parameter, and transmit the calorific value data of gas and the first pressure regulation parameter to the smart gas equipment management platform 130 through the smart gas sensor network platform 140.

In some embodiments, the smart gas object platform 150 may comprise a smart gas indoor equipment object sub-platform 151 and a smart gas pipeline network equipment object sub-platform 152. In some embodiments, the smart gas indoor equipment object sub-platform 151 may correspond to the smart gas indoor equipment sensor network sub-platform 141, and the relevant data of the operation of the indoor equipment is uploaded to the smart gas data center 133 through the indoor equipment sensor network sub-platform 141. In some embodiments, the smart gas pipeline network equipment object sub-platform 152 may correspond to the smart gas pipeline network equipment sensor network sub-platform 142, and the relevant data of the operation of the pipeline network equipment is uploaded to the smart gas data center 133 through the pipeline network equipment sensor network sub-platform 142.

It should be noted that application scenarios are provided for illustrative purposes only, and are not intended to limit the scope of this disclosure. For ordinary technicians skilled in the art, various modifications or changes may be made based on the description of this disclosure. For example, the application scenarios may also comprise a database. As another example, the application scenarios may be implemented on other equipment to achieve similar or different functions. However, changes and modifications may not depart from the scope of this disclosure.

Figure 2:
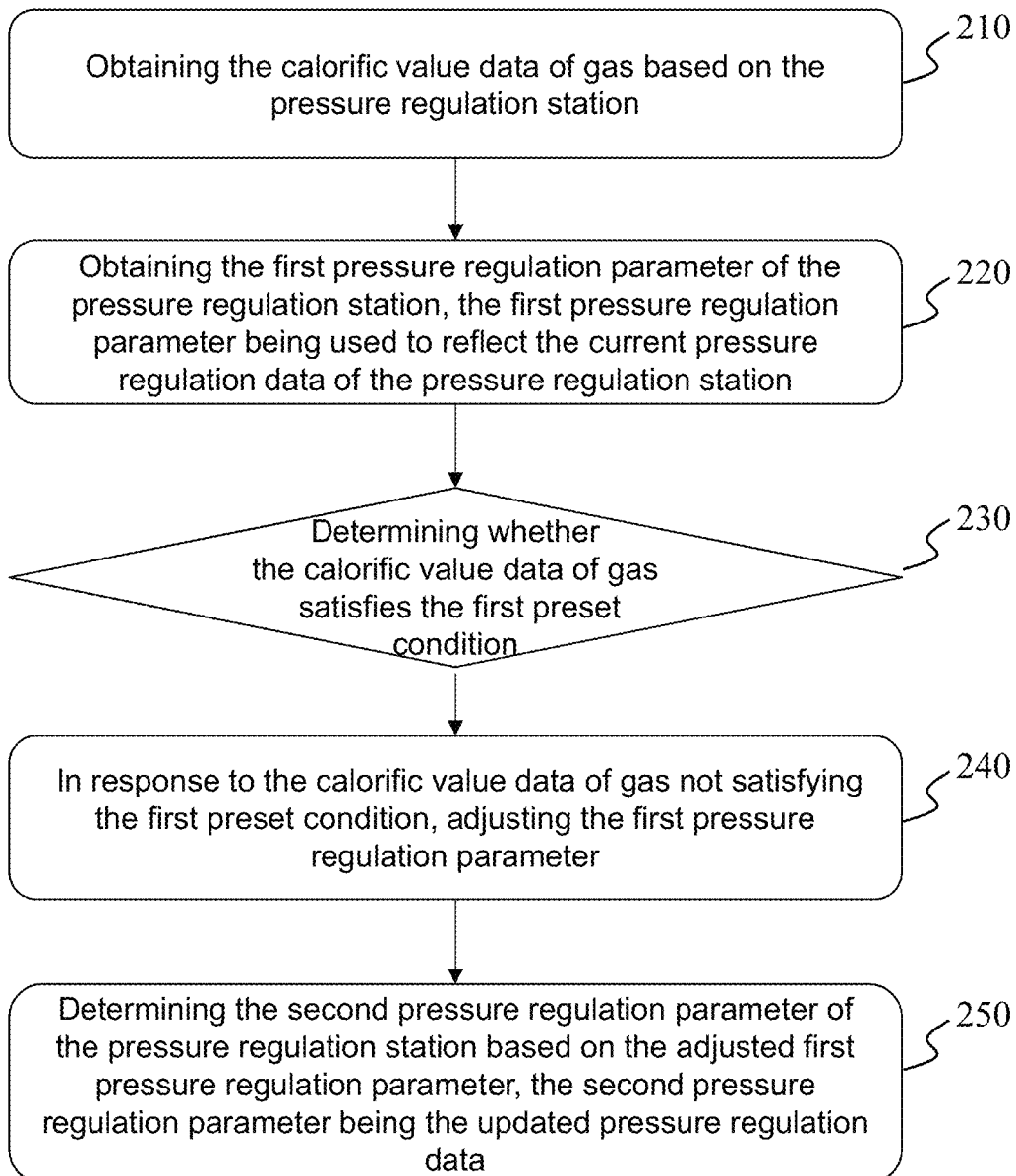
FIG. 2 is an exemplary flowchart of the smart gas adaptive pressure regulation method based on the calorific value of gas according to some embodiments of the present disclosure.

FIG. 2 is an exemplary flowchart of the smart gas adaptive pressure regulation method based on the calorific value of gas according to some embodiments of the present disclosure. In some embodiments, the process 200 may be performed by the smart gas equipment management platform 130. As shown in FIG. 2, the process 200 comprises the following steps.

Step 210, obtaining the calorific value data of gas based on the pressure regulation station.

Gas refers to a mixture of gases with different components. The main component of gas is methane, which may be burned to release heat. Some of the components of gas are not combustible, such as nitrogen, carbon dioxide, etc. The calorific value refers to a property/attribute of a fuel substance, similar to density, specific heat capacity, etc. The calorific value of gas refers to the heat that may be released by the combustion of a unit volume (or mass) of gas. It may be understood that, in terms of gas as a whole, the calorific value of gas with different component ratios (or different calorific values of gas) may be different. The difference in the calorific values of gas may affect the actual gas use effect of a gas use determinal. For example, under the same heat load, the calorific value of gas increases and the residential gas consumption decreases. As another example, after the calorific value of the gas increases too much, gas consumption may be decreased too much, which may be lower than the rated gas of a gas appliance, resulting in incomplete combustion of gas, unable to be effectively used, affecting the thermal efficiency and causing pollution, etc.

The calorific value data of gas refers to the calorific data that may be released by unit volume or mass of gas, which may also be called heat release data of gas. For example, the calorific value data per cubic meter of natural gas may be 8704 kilocalories/standard cubic meter (Kcal/Nm$^3$) or 36.44 megajoules/standard cubic meter (MJ/Nm$^3$), etc.

In some embodiments, the calorific value data of gas may be obtained by calculation through analyzing the components of gas. A gas component analysis method refers to a method for on-line continuous detection of various main combustible gas components in mixed combustible gases. The mutual influence between the gases may be eliminated through computer digital-analog calculation according to the standard calorific value (KJ/Nm$^3$) of each gas component and the percentage in the mixed gases may be eliminated, and direct detection of the calorific value of gas may be realized. For example, the gas component analysis method may comprise gas chromatography, chemiluminescence, non-dispersive infrared method, etc., and the gas calorific value analysis method may comprise water flow calorific analysis, combustion calorific value analysis, infrared calorific value analysis, and the like.

In some embodiments, when the calorific value of gas fluctuates more or more frequently, the frequency of obtaining the calorific value data of gas may be higher. For example, the calorific value of gas fluctuates from the original 8000 Kcal/Nm$^3$ to 10000 Kcal/Nm$^3$ per day, and the frequency of obtaining the calorific value data of gas may be changed from 1 time/day to 3 times/day, etc.

The pressure regulation station refers to a facility used to adjust and stabilize the pressure of the pipeline network in an urban gas pipeline network system. The pressure regulation station has the functions of detection, filtration, metering, pressure regulation, heat tracing, odorization, distribution, remote telemetry/remote control, etc. The pressure regulation station may comprise a pressure regulator, a filter, a safety device, a bypass pipe, a measuring instrument, etc. The pressure regulation station may be used for pressure regulation or storage management through remote control of equipment of the pressure regulation station. The pressure regulation station may receive high-pressure gas from the pipeline network, and convert the high-pressure gas, odorize the high-pressure gas, etc., and then transport the high-pressure gas to an urban central pipeline network.

In some embodiments, a plurality of pressure regulation stations may be included between the pressure regulation station at an initial gas supply end and the pressure regulation station connected to the gas user terminal. The plurality of pressure regulation stations may be connected in turn according to the sequence of high and medium pressure regulation station-medium and low pressure regulation station— . . . —terminal pressure regulation station-gas user terminal.

In some embodiments, the calorific value data of gas in the station or output gas of the station may be obtained based on the pressure regulation station. For example, the pressure regulation station may obtain the calorific value data of gas according to an indirect calculation method, a direct measurement method, etc. For example, the calorific value of gas depends on the chemical components of gas, the chemical components of gas are identified by physical or chemical separation and analysis methods, and the calorific value of the gas may be accurately calculated by a formula from the calorific value of each component. As another example, gas continuously passes through the calorimeter to make the gas burn completely, and the high calorific value of the gas may be calculated according to the volume of the burned gas and the amount of water/temperature difference during the combustion time.

Step 220: obtaining the first pressure regulation parameter of the pressure regulation station, the first pressure regulation parameter being used to reflect the current pressure regulation data of the pressure regulation station.

The first pressure regulation parameter refers to the current pressure regulation data of the pressure regulation station. In some embodiments, the first pressure regulation parameter may comprise incoming gas pressure and outgoing gas pressure of the pressure regulation station, and the like. In some embodiments, the first pressure regulation parameter may comprise current pressure regulation parameters of a plurality of pressure regulation stations from the pressure regulation station at the initial gas supply end to the pressure regulation station connected to the gas user terminal. Taking the connection of high and medium pressure regulation station-medium and low pressure regulation station . . . terminal pressure regulation station as an example, the first pressure regulation parameter may comprise the incoming gas pressure and the outgoing gas pressure of the high and medium pressure regulation station, the incoming gas pressure and the outgoing gas pressure of the medium and low pressure regulation station, . . . , the incoming gas pressure and the outgoing gas pressure of the terminal pressure regulation station. Theoretically, the result of subtracting a gas pressure loss in the gas pipeline connecting the high and medium pressure regulation station and the medium and low pressure regulation station from the outgoing gas pressure of the high and medium pressure regulation station may be used as the incoming gas pressure of the medium and low pressure regulation station. In some embodiments, the medium and low pressure pressure regulation station may also appropriately pressurize or depressurize input gas according to the actual situation. For a specific description of the gas pressure loss, please refer to the description of FIG. 4. Similarly, the result of subtracting the gas pressure loss in the gas pipeline connecting the terminal pressure regulation station and the gas user terminal from the outgoing gas pressure of the terminal pressure regulation station may be used as the terminal gas pressure of the gas user terminal.

In the following, for the convenience of explanation, the whole scheme is illustrated by taking the first pressure regulation parameter of one of the pressure regulation stations as an example. In practice, the corresponding pressure regulation parameters of other pressure regulation stations may be determined based on the position of the pressure regulation station in the entire connection sequence and the settings of each pressure regulation station. For example, the first pressure regulation parameter of a certain pressure regulation station may be that the incoming pressure is 0.4 MPa and the outgoing pressure is 0.025 MPa, and the like.

In some embodiments, the first pressure regulation parameter may be determined manually based on historical experience. In some embodiments, the first pressure regulation parameter may be determined based on the smart gas equipment management platform 130. For example, the system automatically determines the first pressure regulation parameter based on upstream and downstream gas use data.

It may be understood that when the smart gas pipeline network equipment object sub-platform 152 of the smart gas object platform 150 is configured as the pressure regulation station, the calorific value data of gas and the first pressure regulation parameter may be obtained directly based on the smart gas object platform 150.

Step 230, determining whether the calorific value data of gas satisfies the first preset condition.

The first preset condition refers to a condition for determining whether the pressure regulation station needs to perform pressure regulation control. In some embodiments, the first preset condition may comprise a calorific value range of gas. For example, the first preset condition may be that the calorific value of gas is between 7000 Kcal/Nm$^3$ and 8000 Kcal/Nm$^3$.

In some embodiments, the first preset condition may be determined according to user experience, gas user terminal performance, historical data, and the like. For example, the user may manually determine the first preset condition. As another example, the smart gas equipment management platform 130 may determine the first preset condition based on the historical data and the terminal performance.

In some embodiments, the smart gas equipment management platform 130 may automatically determine whether the calorific value data of gas satisfies the first preset condition according to the obtained calorific value data of gas. For example, the first preset condition is that a calorific value threshold of gas is 7000 Kcal/Nm$^3$-8000 Kcal/Nm$^3$, and when the calorific value of gas is 6000 Kcal/Nm$^3$, the system determines that the currently obtained calorific value data of gas does not satisfy the first preset condition.

Step 240, in response to the calorific value data of gas not satisfying the first preset condition, adjusting the first pressure regulation parameter.

In some embodiments, an empirical comparison table of the first pressure regulation parameter may be preset, and the first pressure regulation parameter may be adjusted in a manner such as determining the adjustment value of the first pressure regulation parameter according to table look-up. For example, in the empirical comparison table of the first pressure regulation parameter, the adjustment value of the first pressure regulation parameter corresponding to various types of calorific value data of gas may be counted based on the historical data, and then the adjustment value of the first pressure regulation parameter that best conforms to the current actual situation may be determined based on table look-up to adjust the first pressure regulation parameter. As an example only, when the obtained calorific value of gas is lower than the calorific value threshold range of gas included in the first preset condition, the adjustment to the first pressure regulation parameter may be to appropriately increase the first pressure regulation parameter, and when the calorific value of gas is higher than the calorific value threshold range of gas included in the first preset condition, the first pressure regulation parameter may be appropriately decreased.

In some embodiments, the predicted terminal pressure of the gas user terminal may be determined based on the first pressure regulation parameter of the pressure regulation station; the adjustment value of the first pressure regulation parameter may be determined based on the difference between the predicted terminal pressure and the preset standard pressure; and the first pressure regulation parameter is adjusted based on the adjustment value. For more description of adjusting the first pressure regulation parameter, please refer to FIG. 3.

Step 250: determining the second pressure regulation parameter of the pressure regulation station based on the adjusted first pressure regulation parameter, the second pressure regulation parameter being the updated pressure regulation data.

The second pressure regulation parameter refers to the pressure regulation data of the gas station after the first pressure regulation parameter is corrected and adjusted based on the calorific value data of gas. In some embodiments, the adjusted first pressure regulation parameter may be used as the second pressure regulation parameter of the pressure regulation station. For example, the first pressure regulation parameter may be that the incoming pressure is 0.4 MPa and the outgoing pressure is 0.025 MPa, and the second pressure regulation parameter of the pressure regulation station determined based on the adjusted first pressure regulation parameter may be that the incoming pressure is 0.4 MPa and the outgoing pressure is 0.025 MPa, or the incoming pressure is 0.4 MPa and the outgoing pressure is 0.022 MPa, etc.

For more description of the manner of determining the second pressure regulation parameter, please refer to the contents of other parts of this disclosure, such as the description of FIG. 3 and FIG. 5, etc.

According to some embodiments of this disclosure, the calorific value data of gas is obtained. When the calorific value data of gas does not satisfy the first preset condition, the pressure regulation station is adjusted based on the first pressure regulation parameter and the second pressure regulation parameter, the gas pressure is adjusted, and the gas use efficiency is controlled at a stable level to satisfy the user's use needs.

In some embodiments, after determining the second pressure regulation parameter, the smart gas equipment management platform 130 may determine whether the second pressure regulation parameter satisfies the second preset condition; in response to the second pressure regulation parameter not satisfying the second preset condition, determine a final pressure regulation parameter based on the second pressure regulation parameter; and send the final pressure regulation parameter to the user and receive the feedback from the user.

The second preset condition is a condition for determining whether the second pressure regulation parameter is reasonable. In some embodiments, the second preset condition comprises that the second pressure regulation parameter is within a preset parameter range.

The preset parameter range refers to a preset gas pressure regulation range of the pressure regulation station, comprising a maximum adjustment limit and a minimum adjustment limit. For example, the preset parameter range may comprise the maximum adjustment limit of 0.05 MPa, the minimum adjustment limit of 0.001 MPa, and the like. In some embodiments, the preset parameter range is related to the gas user terminal. For example, the preset parameter range of different gas user terminals may be different. Different gas user terminals may refer to different parameter information of the gas user terminals. For more description of the gas user terminals, please refer to the description of FIG. 3. For further description of the parameter information of the gas user terminal, please refer to the description of FIG. 4. In some embodiments, the preset parameter range may be determined manually and empirically based on the specific conditions of the gas user terminal corresponding to the pressure regulation station. In some embodiments, the preset parameter range may be determined and adjusted by using a determination model. For more description of using the determination model to obtain the preset parameter range, please refer to FIG. 6.

Through some embodiments of this disclosure, the evaluation conditions of the second pressure regulation parameter may be preset, and different evaluation conditions may be determined according to different gas user terminal s to evaluate whether the adjustment is reasonable, thereby ensuring that the determined second pressure regulation parameter conforms to the actual situation, and also determining a reasonable adjustment range according to the actual gas user terminal, so as to flexibly satisfy the user's use needs and gas use stability.

In some embodiments, when the second pressure regulation parameter does not satisfy the second preset condition, the final pressure regulation parameter may be determined based on the second pressure regulation parameter; and the final pressure regulation parameter is sent to the user and the feedback from the user is received.

The final adjustment parameter refers to the final pressure regulation data of the gas station determined based on the actual situation and determined on the basis of the second pressure regulation parameter. It may be understood that when the adjusted second pressure regulation parameter does not satisfy the second preset condition, if the second pressure regulation parameter is directly executed, it may cause a large pressure fluctuation, and cause certain influence on terminal gas use due to the pressure fluctuation. Therefore, in order to ensure normal gas use of the gas use terminal, it is necessary to adjust the second pressure regulation parameter that does not satisfy the second preset condition again to determine the final pressure regulation parameter for the pressure regulation station to execute. As an example only, the first pressure regulation parameter is that the incoming pressure is 0.4 MPa and the outgoing pressure is 0.025 MPa, the second pressure regulation parameter is that the incoming pressure is 0.4 MPa and the outgoing pressure is 0.1 MPa, the corresponding gas use terminal based on the pressure regulation station is an industrial gas use terminal, and the preset parameter range of the gas use terminal comprises the maximum adjustment limit, which may be 0.07 MPa, while the adjustment value corresponding to the current second pressure regulation parameter is 0.075 MPa (i.e., 0.1 MPa-0.025 MPa), which exceeds the preset parameter range, that is, the second pressure regulation parameter does not satisfy the second preset condition, and the second pressure regulation parameter needs to be adjusted to determine the final pressure regulation parameter.

In some embodiments, the final pressure regulation parameter may be determined manually by adjusting the second pressure regulation parameter according to the maximum adjustment limit and the minimum adjustment limit within the preset range. As in the previous example, the second preset condition based on the gas use terminal corresponding to the pressure regulation station comprises the maximum adjustment limit of 0.07 MPa in the preset parameter range, it may be determined that the final pressure regulation parameter may be that the incoming pressure is 0.4 MPa and the outgoing pressure is 0.095 MPa.

In some embodiments, the final pressure regulation parameter may be determined by adjusting the second pressure regulation parameter within the preset range based on a machine learning model. For example, the final pressure regulation parameter is determined through model processing based on the historical second pressure regulation parameters. For example, the second pressure regulation parameter and the preset range may be used as an input of the machine learning model, and the final pressure regulation parameter may be used as an output of the machine learning model. The machine learning model may be obtained based on training, and the training data of the machine learning model may be the historical second pressure regulation parameters and the preset range. The training data includes historical incoming pressure, historical outgoing pressure, historical preset ranges, etc. The tag of the training data may be a final executed pressure regulation parameter corresponding to the historical second pressure regulation parameters and the preset range.

In some embodiments, the final pressure regulation parameter may be sent to the user through the smart gas user platform 110 based on the smart gas service platform 120 for user confirmation and feedback.

The user's feedback refers to the relevant operations performed by the user after receiving the final pressure regulation parameter. For example, the user's feedback may be acceptance, change, rejection, etc.

In some embodiments, the user's feedback may be received through the smart gas user platform 110 based on the smart gas service platform 120. For example, the user's feedback may be received through the government user sub-platform 112 of the smart gas user platform 110 based on the smart operation service sub-platform 122 of the smart gas service platform 120.

According to the change of the calorific value of gas according to some embodiments of this disclosure, when the second pressure regulation parameter does not satisfy the second preset condition, the final pressure regulation parameter is determined based on the second pressure regulation parameter, the determined final pressure regulation parameter is sent to the user, and the user's feedback is received, ensuring that the gas use pressure is maintained as stable as possible under the normal level of the calorific value of gas, and may be flexibly adjusted according to the different feedback of the user.

It should be noted that the above descriptions about steps 210-250 are only for example and description, and do not limit the scope of application of this disclosure. For technicians skilled in the art, various corrections and changes may be made to steps 210-250 under the guidance of this disclosure. However, these corrections and changes are still within the scope of this disclosure.

FIG. 3 is an exemplary flowchart of adjusting the first pressure regulation parameter according to some embodiments of the present disclosure. In some embodiments, the process 300 may be performed by a smart gas equipment management platform. As shown in FIG. 3, the process 300 comprises the following steps.

Step 310: determining the predicted terminal pressure of the gas user terminal at least based on the first pressure regulation parameter of the pressure regulation station.

The gas user terminal refers to the gas equipment used by the user, such as a gas stove, a gas water heater, etc. The gas user terminal may comprise a variety of terminal types, such as an industrial gas use terminal, a residential gas use terminal, a commercial gas use terminal, etc.

The predicted terminal pressure refers to a predicted value obtained by predicting the gas pressure of the gas equipment used indoors by the user. For example, the predicted terminal pressure may be 1950 Pa, 1960 Pa, etc.

In some embodiments, the smart gas equipment management platform may process the parameters obtained from the pressure regulation station through various feasible methods, so as to determine the predicted terminal pressure of the gas user terminal.

In some embodiments, the smart gas equipment management platform may determine the predicted terminal pressure of the gas user terminal based on the first pressure regulation parameter of the pressure regulation station. For example, a gas pressure comparison table may be established based on the first pressure regulation parameter in the historical data and a corresponding terminal gas pressure thereof, and the predicted terminal pressure of the gas user may be determined by looking up the table.

In some embodiments, the smart gas equipment management platform may determine the predicted terminal pressure based on the processing of the first pressure regulation parameter and the pipeline information of the gas pipeline connected to the pressure regulation station by the pressure prediction model, the pressure prediction model being a machine learning model.

The first pressure regulation parameter refers to preliminary pressure regulation data of the pressure regulation station determined manually or by the system according to the upstream and downstream gas use data, the historical experience, etc. For more information about the first pressure regulation parameter, please refer to FIG. 2 and related description thereof.

The pipeline information refers to the attribute information of the gas pipeline, such as the material of the pipeline, the diameter of the pipeline, the height difference between the head and tail sections of the pipeline, etc.

In some embodiments, the staff may record and upload the pipeline information to the smart gas data center of the smart gas equipment management platform during construction or maintenance of the gas pipeline. In some embodiments, the pipeline information may be updated within a preset time, for example, it is preset to perform a pipeline maintenance and update the pipeline information in the smart gas data center once a year.

In some embodiments, an input to the pressure prediction model may comprise the first pressure regulation parameter and the pipeline information. An output of the pressure prediction model may comprise the predicted terminal pressure.

In some embodiments, the pressure prediction model may be separately trained based on the historical data. In some embodiments, the pressure prediction model may be obtained by training based on a plurality of training samples and tags. For example, the training samples may be inputted into an initial pressure prediction model, a loss function may be constructed based on the output and tags of the initial pressure prediction model, and the parameters of the initial pressure prediction model may be updated through the loss function until the trained initial pressure prediction model satisfies the preset condition, and the trained pressure prediction model is obtained, the preset condition may be that the loss function is less than the threshold, converges, or the training period reaches the threshold, etc.

In some embodiments, the training samples comprise a sample first pressure regulation parameter and sample pipeline information. The tags are an actual terminal pressure of the gas user terminal. The training samples may be obtained based on the historical data, and the tags of the training samples may be determined by manual labeling or automatic labeling. The tags of the training samples may also be obtained in various ways, which are not limited here.

In some embodiments, the pressure prediction model may comprise various feasible neural network models, such as Convolutional Neural Networks (CNN), Deep Neural Networks (DNN), etc. or a combination thereof. For more contents on the pressure prediction model, please see FIG. 4 and related description thereof.

In some embodiments of this disclosure, determining the predicted terminal pressure by processing the first pressure regulation parameter and the pipeline information through the pressure prediction model may improve the efficiency of data processing and the accuracy of predicting the predicted terminal pressure, thereby ensuring the efficiency of gas use.

Step 320: determining the adjustment value of the first pressure regulation parameter based on the difference between the predicted terminal pressure and the preset standard pressure.

The preset standard pressure refers to a pressure corresponding to gas at the gas user terminal when the gas use efficiency is high. For example, when the gas use efficiency is ≥90%, the gas pressure is 1960 Pa, and the preset standard pressure is 1960 Pa.

In some embodiments, the preset standard pressure may be calculated by the system or determined based on expert advice. For example, the system obtains the preset standard pressures under different gas user terminal types and different calorific values of gas through historical data calculation.

The adjustment value refers to a value that needs to be increased or decreased for the first pressure regulation parameter. For example, an adjustment value of 0.001 MPa means an increase of 0.001 MPa. As another example, an adjustment value of −0.001 MPa means a decrease of 0.001 MPa.

In some embodiments, the smart gas equipment management platform may use various feasible data analysis algorithms, such as a regression algorithm, a discrimination algorithm, etc., to process the predicted terminal pressure and the preset standard pressure, so as to determine the adjustment value of the first pressure regulation parameter.

In some embodiments, the smart gas equipment management platform may use an interpolation method to process the predicted terminal pressure and the preset standard pressure to determine the adjustment value of the first pressure regulation parameter. For example, the preset standard pressure is 2000 Pa, and the preset standard pressure corresponds to a pressure regulation parameter A; if the predicted terminal pressure is 1950 Pa, and the predicted terminal pressure is 97.5% of the preset standard pressure, the adjustment value of the first pressure regulation parameter may be $A*97.5\%*\alpha+\beta$; $\alpha$ is a weight coefficient, $\beta$ is a constant, α and β are related to the type of the gas user terminal and may be preset in advance.

In some embodiments, the smart gas equipment management platform may determine the adjustment value through a preset algorithm. For more contents about determining the adjustment value through the preset algorithm, please refer to FIG. 5 and related description thereof.

Step 330: adjusting the first pressure regulation parameter based on the adjustment value.

In some embodiments, the smart gas equipment management platform may adjust the first pressure regulation parameter based on the adjustment value. For example, if the adjustment value is 0.01 MPa, and the first pressure regulation parameter is that the incoming pressure is 0.4 MPa and the outgoing pressure is 0.025 MPa, the first pressure regulation parameter adjusted based on the adjustment value is that the incoming pressure is 0.4 MPa and the outgoing pressure is 0.035 MPa.

In some embodiments of this disclosure, the adjustment value of the first pressure regulation parameter is determined by the difference between the predicted terminal pressure and the preset standard pressure to adjust the first pressure regulation parameter, so as to ensure the scientificity and rationality of the adjustment range of the first pressure regulation parameter, and improve the efficiency of gas use on the premise of ensuring the safety of gas use and satisfy the user needs.

Figure 4:
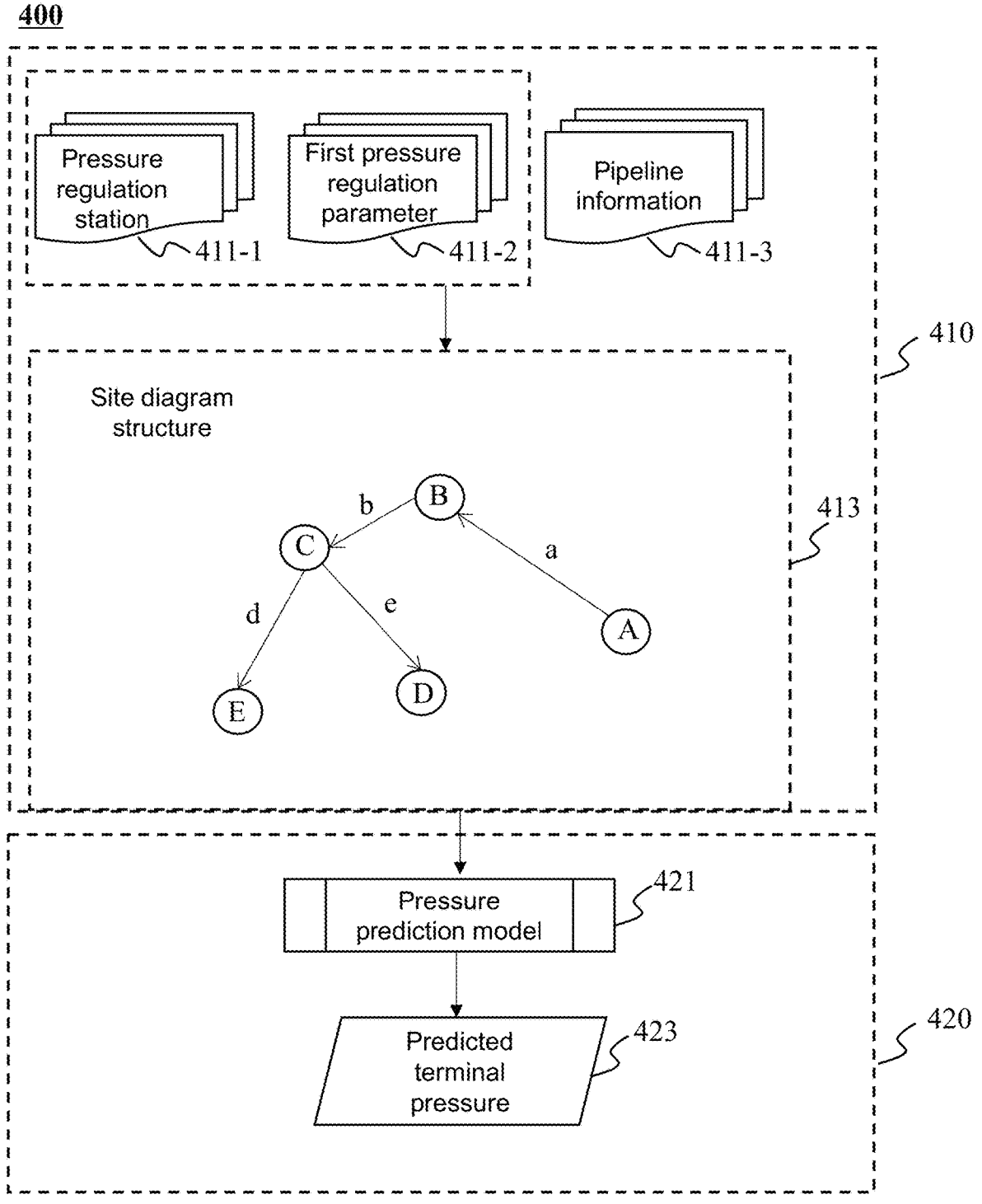
FIG. 4 is an exemplary schematic diagram of determining the predicted terminal pressure of gas according to some embodiments of the present disclosure.

FIG. 4 is an exemplary schematic diagram of determining the predicted terminal pressure according to some embodiments of the present disclosure. In some embodiments, the smart gas equipment management platform may determine the predicted terminal pressure by performing the following steps of the process 400.

Step 410, establishing a site diagram structure based on the pressure regulation station, the first pressure regulation parameter, and the pipeline information.

For more contents about the pressure regulation station 411-1 and the first pressure regulation parameter 411-2, please refer to FIG. 2 and related description thereof, and for more contents about the pipeline information 411-3, please refer to FIG. 3 and related description thereof.

The site diagram structure refers to a nonlinear data structure representing the relationship among the pressure regulation station, the first pressure regulation parameter and the pipeline information, and the site diagram structure comprises nodes and edges.

The nodes of the site diagram structure correspond to the gas pressure regulation equipment during gas transportation. For example, one node corresponds to one pressure regulation station. In some embodiments, at least part of the nodes of the site diagram structure correspond to the pressure regulation stations. For example, nodes A, B, C, D, and E in FIG. 4 are the nodes of the site diagram structure, and each node corresponds to one pressure regulation station respectively. As an example only, the node A corresponds to a high and medium pressure regulation station, the node B corresponds to a medium pressure regulation station, the node C corresponds to a medium and low pressure regulation station, and the nodes D and E correspond to low pressure regulation stations.

The attributes of the nodes refer to the information related to the gas pressure contained in the nodes. In some embodiments, the attributes of the nodes comprise an incoming gas pressure and an outgoing gas pressure of the pressure regulation station.

The incoming gas pressure refers to a pressure when gas is inputted into the pressure regulation station through the gas pipeline, which may be understood as the aforementioned incoming pressure. The outgoing gas pressure refers to a pressure when the gas is outputted from the pressure regulation station through the gas pipeline, which may be understood as the aforementioned outgoing pressure.

In some embodiments, the pressure regulation station may use gas pressure measuring equipment (e.g., a gas pressure sensor, etc.) to measure the incoming pressure and the outgoing pressure of gas, so as to obtain the incoming gas pressure and the outgoing gas pressure, and upload the data to the smart gas data center of the smart gas equipment management platform. In some embodiments, after the incoming pressure and the outgoing pressure of a certain pressure regulation station are obtained, the incoming pressure and the outgoing pressure of other pressure regulation stations may be determined based on the setting position of the pressure regulation station in the entire pressure regulation station chain. Please refer to the description of FIG. 2 for details.

In some embodiments, the nodes of the site diagram structure may also comprise an end node.

The end node means that the pressure regulation station corresponding to the node is directly connected to the gas user terminal, that is, the end node may correspond to an end pressure regulation station. For example, the node D in FIG. 4 is directly connected to the gas user terminal, then the node D is the end node.

The attributes of the end node refer to the information related to the gas pressure contained in the end node, such as the incoming gas pressure and the outgoing gas pressure of the pressure regulation station. In some embodiments, the attributes of the end node further comprise parameter information of the corresponding gas user terminal.

The parameter information of the gas user terminal refers to the information related to the gas pressure of the gas user terminal, such as the type, quantity, activity, gas use data, etc. of the gas user terminal corresponding to the pressure regulation station. For more contents about the type of the gas user terminal, please see FIG. 5 and related description thereof. The quantity refers to a quantity of gas equipment included in the gas user terminal. For example, if the gas user terminal comprises 10 gas stoves and 5 gas water heaters, the quantity is 15. The activity refers to an activity level of gas user terminal use during a time period. For example, if 85% of gas user terminals have recent use records (e.g., within the last month), the activity is 85%. The gas use data refers to an average daily gas consumption of the gas user terminal during a time period. For example, if the average daily gas consumption of the gas user terminal is 1.5 cubic meters in a recent period (e.g., within the last month), the use data is 1.5 cubic meters per day.

In some embodiments, the smart gas object platform may obtain the parameter information of the gas user terminal, and upload the data to the smart gas data center of the smart gas equipment management platform.

The edges of the site diagram structure may correspond to a gas pipeline route of the pressure regulation station corresponding to the connected nodes. In some embodiments, the direction of the edges corresponds to the direction of gas flow. For example, an edge a in FIG. 4 may correspond to the gas pipeline connecting the pressure regulation station corresponding to the node A and the pressure regulation station corresponding to the node B, and the arrow of the edge a may indicate that the direction of gas flow is from the node A to the node B.

The attributes of the edges refer to the information related to the gas pressure that the edges contain, such as the type of gas (e.g., artificial gas, natural gas, liquefied petroleum gas, etc.), the flow rate of gas (e.g., 6 m/s, etc.), etc. In some embodiments, the attributes of the edges comprise the gas pressure loss in the gas pile line to which the edges correspond.

The gas pressure loss refers to an amount of pressure loss generated by gas during transportation. For example, the gas pressure loss may be 15 Pa.

In some embodiments, the gas pressure loss may be determined based on factors such as the material, diameter, and height difference between the head and tail sections of the gas pipeline.

Step 420, outputting the predicted terminal pressure based on at least part of the nodes of the site diagram structure according the processing of the site diagram structure by the pressure prediction model.

The pressure prediction model refers to a model used to process the site diagram structure to determine the predicted terminal pressure. In some embodiments, the pressure prediction model may be a Graph Neural Networks (GNN) model.

In some embodiments, an input of the pressure prediction model 421 may comprise a site diagram structure 413 established based on the pressure regulation station 411-1, the first pressure regulation parameter 411-2 and the pipeline information 411-3, and an output of the pressure prediction model 421 may comprise the predicted terminal pressure 423, such as the predicted terminal pressure 423 outputted by each node.

In some embodiments, the predicted terminal pressure may be determined based on the output of the end node. For example, the node D in FIG. 4 is directly connected to the gas user terminal, and the node D is the end node, then the pressure prediction model 421 may output the predicted terminal pressure 423 based on the node D.

In some embodiments, the pressure prediction model 421 may be independently trained based on the historical data. In some embodiments, the pressure prediction model 421 may be obtained by training based on a plurality of training samples and tags. The training samples are inputted into the initial pressure prediction model, a loss function is constructed based on the output and the tags of the initial pressure prediction model, and the parameters of the initial pressure prediction model are updated through the loss function until the trained initial pressure prediction model satisfies the preset condition, and the trained pressure prediction model 421 is obtained, and the preset condition may be that the loss function is less than the threshold, converges, or the training period reaches the threshold, or the like.

In some embodiments, the training samples comprise a sample site diagram structure established based on a sample pressure regulation station, a sample first pressure regulation parameter, and sample pipeline information. The tags are the corresponding actual terminal pressure. The training samples may be obtained based on the historical data, and the tags of the training samples may be determined by manual labeling or automatic labeling. The tags of the training samples may be obtained in various ways, which are not limited here.

In some embodiments of this disclosure, by establishing the diagram structure based on the pressure regulation station, the first pressure regulation parameter and the pipeline information, and using the pressure prediction model to determine the predicted terminal pressure, the efficiency and accuracy of determining the predicted terminal pressure may be effectively improved. In addition, by establishing the diagram structure, the relationship between the nodes and the edges may be clearly determined, and the relationship between the gas pressure and the pressure regulation station and the transport pipeline may be reasonably considered, so that the finally determined predicted terminal pressure is more in line with the actual situation.

FIG. 5 is an exemplary flowchart of determining the adjustment value of the first pressure regulation parameter according to some embodiments of the present disclosure. In some embodiments, the process 500 may be performed by the smart gas equipment management platform. As shown in FIG. 5, the process 500 comprises the following steps.

Step 510: determining a gas efficiency evaluation score based on the calorific value data of gas and the predicted terminal pressure.

For more contents about the calorific value data of gas, please refer to FIG. 2 and related description thereof, and for more contents about the predicted terminal pressure, please refer to FIG. 4 and related description thereof.

The gas efficiency evaluation score refers to a score used to evaluate the gas use efficiency. For example, the gas efficiency evaluation score may be represented by 0-100, and the gas efficiency evaluation score may be 85 points. The higher the gas efficiency evaluation score is, the higher the gas use efficiency is.

In some embodiments, the gas efficiency evaluation score may be determined by a plurality of feasible methods such as table building, vector matching, cluster analysis, mathematical fitting, etc., or a combination thereof. For example, a gas efficiency evaluation table is established by counting the calorific value data of gas and the predicted terminal pressure and the corresponding actual gas efficiency thereof based on the historical data, and the gas efficiency evaluation score is obtained by looking up the table. As another example, a current vector is constructed based on the calorific value data of gas and the predicted terminal pressure, and a reference vector is constructed based on the historical calorific value data of gas and historical terminal pressure obtained from the historical data, and is stored in a historical database in association with the corresponding historical gas efficiency score. A vector distance (such as a cosine distance, etc.) between the current vector and the reference vector is calculated respectively, the reference vector whose distance from the current vector satisfies a preset condition (such as the smallest vector distance) is used as a target vector, and the historical gas efficiency score corresponding to the target vector is used as the gas efficiency evaluation score corresponding to the current vector.

Step 520, determining the adjustment value of the first pressure regulation parameter by performing at least one round of iterative updating on the first pressure regulation parameter through a preset algorithm based on the gas efficiency evaluation score and the site diagram structure.

The preset algorithm refers to an algorithm used to iteratively update the first pressure regulation parameter to determine the adjustment value, such as an interpolation method, etc.

In some embodiments, the preset algorithm may be preset manually or by the system in advance. For example, the staff may preset a calculation formula in advance and input the calculation formula into the smart gas equipment management platform. As another example, the smart gas equipment management platform may obtain and select out available and reasonable algorithms from the network.

In some embodiments, the smart gas equipment management platform may perform at least one round of iterative updating on the first pressure regulation parameter through the following steps 521-527 (not shown in the figure), so as to determine the adjustment value of the first pressure regulation parameter.

Step 521: determining a first candidate adjustment range based on the difference between the gas efficiency evaluation score and a preset evaluation score.

The preset evaluation score refers to a score that is preset in advance as a standard evaluation score. For example, like the gas efficiency evaluation score, the preset evaluation score may be represented by 0-100, and the preset evaluation score may be 95 points.

In some embodiments, the preset evaluation score may be determined manually or by the system. For example, the staff may manually determine a numerical value in advance as the preset evaluation score according to expert advice. As another example, the smart gas equipment management platform may determine an appropriate numerical value as the preset evaluation score according to the historical data.

The first candidate adjustment range refers to a candidate adjustment value determined based on the difference between the gas efficiency evaluation score and the preset evaluation score. For example, the first candidate adjustment range may be 15 Pa.

In some embodiments, the smart gas equipment management platform may use various feasible data analysis algorithms, such as a regression algorithm, a discrimination algorithm, etc., to process the gas efficiency evaluation score and the preset evaluation score to determine the first candidate adjustment range.

In some embodiments, the smart gas equipment management platform may use the following formula (1) to process the gas efficiency evaluation score and the preset evaluation score to determine the first candidate adjustment range.

$$T = (A - B) * \alpha - C * \beta \qquad (1)$$

T represents the first candidate adjustment range; A represents the preset evaluation score; B represents the gas efficiency evaluation score; C represents a difference between a maximum value and a minimum value of the calorific value of gas within a time period (e.g., a preset time period); and $\alpha$, $\beta$ represent conversion coefficients, which may be preset in advance, and represent a conversion coefficient between the gas efficiency evaluation score and the gas pressure and a conversion coefficient between the calorific value of gas and the gas pressure.

In some embodiments, $\alpha$, $\beta$ are related to the type of the gas user terminal and may be determined manually. For example, the gas user terminal may be an industrial gas use terminal, a residential gas use terminal, a commercial gas use terminal, etc. The gas pressure and the calorific value of gas corresponding to different gas user terminals are different, so the gas pressure and the calorific value of gas also change accordingly.

Step 522, determining a second candidate adjustment range by modifying the first candidate adjustment range based on the type of the gas user terminal, and use the determine the second candidate adjustment range as a candidate adjustment value.

The type of the gas user terminal may comprise the industrial gas use terminal, the residential gas use terminal, the commercial gas use terminal, and the like.

The second candidate adjustment range refers to the candidate adjustment value obtained by modifying the first candidate adjustment range based on the type of the gas user terminal. For example, the second candidate adjustment range may be 10 Pa.

In some embodiments, the smart gas equipment management platform may obtain the types of the gas user terminals corresponding to different end pressure regulation stations, and modify the first candidate adjustment range based on the types of the gas user terminal to determine the second candidate adjustment range. For example, the industrial gas use terminal, the residential gas use terminal, and the commercial gas use terminal have different gas pressures and calorific values of gas. When the calorific value data of gas fluctuates greatly, the first candidate adjustment range is correspondingly decreased.

In some embodiments, the smart gas equipment management platform may obtain the types of the gas user terminals corresponding to different end pressure regulation stations, preset the range of pressure adjustment ranges acceptable for different types of gas user terminals, and then modify the first pressure adjustment range based on the pressure adjustment range to determine the second candidate adjustment range. For example, the pressure adjustment range of residential gas use is less than that of industrial gas use.

The candidate adjustment value refers to the finally determined second candidate adjustment range, that is, the candidate adjustment value may be the second candidate adjustment range obtained by modifying the first candidate adjustment range. For example, if the second candidate adjustment range is 10 Pa, the candidate adjustment value is 10 Pa.

Step 523: determining a second candidate pressure regulation parameter based on the candidate adjustment value, and determining a new predicted gas terminal pressure based on the second candidate pressure regulation parameter.

The second candidate pressure regulation parameter refers to pressure regulation data determined after modifying the first candidate adjustment range. For example, the second candidate pressure regulation parameter may be that the incoming pressure is 0.4 MPa and the outgoing pressure is 0.028 MPa.

In some embodiments, the smart gas equipment management platform may determine the second candidate pressure regulation parameter based on the candidate adjustment value. For example, the candidate adjustment value is 0.003 MPa. If the first pressure regulation parameter is that the incoming pressure is 0.4 MPa and the outgoing pressure is 0.025 MPa, then the second candidate pressure regulation parameter is that the incoming pressure is 0.4 MPa and the outgoing pressure is 0.028 MPa.

In some embodiments, the smart gas equipment management platform may determine the new predicted gas terminal pressure based on the second candidate pressure regulation parameter. For example, the new predicted gas terminal pressure may be determined based on the determined second candidate pressure regulation parameter of the end pressure regulation station. For example, the incoming gas pressure of the second candidate pressure regulation parameter of the end pressure regulation station is 0.027 MPa, and the outgoing pressure is 1990 Pa, at the same time, the gas pressure loss of the gas pipeline connecting the end pressure regulation station and the gas terminal user is 10 Pa, and the corresponding new predicted gas terminal pressure is 1980 Pa.

In some embodiments, the smart gas equipment management platform may process the second candidate pressure regulation parameter through the pressure prediction model to determine the new predicted gas terminal pressure.

In some embodiments, an input of the pressure prediction model may comprise map data constructed based on the pressure regulation station, the second candidate pressure regulation parameter and pipeline information, and an output of the pressure prediction model may comprise the new predicted gas terminal pressure.

In some embodiments, the training samples comprise sample map data constructed based on a sample pressure regulation station, a second sample candidate pressure regulation parameter, and sample pipeline information. The tags are the corresponding actual terminal pressure. The training samples may be obtained based on the historical data, and the tags of the training samples may be determined by manual labeling or automatic labeling. The tags of the training samples may be obtained in various ways, which are not limited here.

Determining the new predicted gas terminal pressure based on the second candidate pressure regulation parameter through the pressure prediction model is the same as determining the predicted gas terminal pressure based on the first pressure regulation parameter through the pressure prediction model. For more contents about the pressure prediction model, please see FIG. 3, FIG. 4 and related description thereof.

Step 524: determining an updated gas efficiency evaluation score based on the calorific value data of gas and the new predicted gas terminal pressure.

For more contents about the calorific value data of gas, please see FIG. 2 and related description thereof.

The method for determining the new gas efficiency evaluation score by the smart gas equipment management platform is the same as the method for determining the gas efficiency evaluation score. For more contents, please refer to the related description of step 510 in FIG. 5.

Step 525, determining whether the difference between the updated gas efficiency evaluation score and the preset evaluation score satisfies the requirements.

For more contents about the preset evaluation score, please refer to step 521 in FIG. 5 and related description thereof.

In some embodiments, whether the difference between the updated gas efficiency evaluation score and the preset evaluation score satisfies the required condition may be determined manually or in advance by the system. For example, the preset condition may be that the difference between the updated gas efficiency evaluation score and the preset evaluation score is ≤3 points.

Step 526, if the difference between the updated gas efficiency evaluation score and the preset evaluation score satisfies the requirements, stopping the iteration, and using the candidate adjustment value of this round as a final adjustment value of the first pressure regulation parameter.

Step 527, if the difference between the updated gas efficiency evaluation score and the preset evaluation score does not satisfy the requirements, determining a new first candidate adjustment range based on the difference between the updated gas efficiency evaluation score and the preset evaluation score, and continuing the iteration and repeating the above steps 521-525 until the requirements are satisfied.

In some embodiments of this disclosure, by calculating the gas efficiency evaluation score, the relationship between different calorific value data of gas and the predicted terminal pressure may be comprehensively considered, and different types of the gas user terminal may be processed separately, improving the rationality of determining the pressure regulation parameter on the premise of ensuring the safety of gas use.

It should be noted that the above descriptions about the processes 300, 400 and 500 are only for example and illustration, and do not limit the scope of application of the present disclosure. For technicians skilled in the art, various modifications and changes may be made to the processes 300, 400 and 500 under the guidance of this disclosure. However, these modifications and changes are still within the scope of this disclosure.

In some embodiments, after the adjustment value of the first pressure regulation parameter is determined, the first pressure regulation parameter may be adjusted based on the adjustment value of the first pressure regulation parameter to obtain the second pressure regulation parameter.

In some embodiments, in order to further ensure that the obtained second pressure regulation parameter satisfies the actual use requirements, it is also necessary to further determine whether the second pressure regulation parameter satisfies a second preset condition; the second preset condition may comprise that the second pressure regulation parameter is within a preset parameter range. The preset parameter range refers to a preset gas pressure regulation range of the pressure regulation station. The preset parameter range is related to the gas user terminal. For example, the preset parameter range of the industrial gas use terminal may be larger than that of the residential gas use terminal. For more description of the preset parameter range, please refer to the description of FIG. 2.

In some embodiments, the preset parameter range comprises a maximum adjustment limit and a minimum adjustment limit. The maximum adjustment limit is an upper limit of the gas pressure adjustment range. The minimum adjustment limit is a lower limit of the gas pressure adjustment range. For example, the preset parameter range may be 50 Pa-10 Pa, then the maximum adjustment limit is 50 Pa, and the minimum adjustment limit is 10 Pa. It should be noted that the range values in this embodiment are only examples, and need to be set according to specific conditions in practice.

Figure 6:
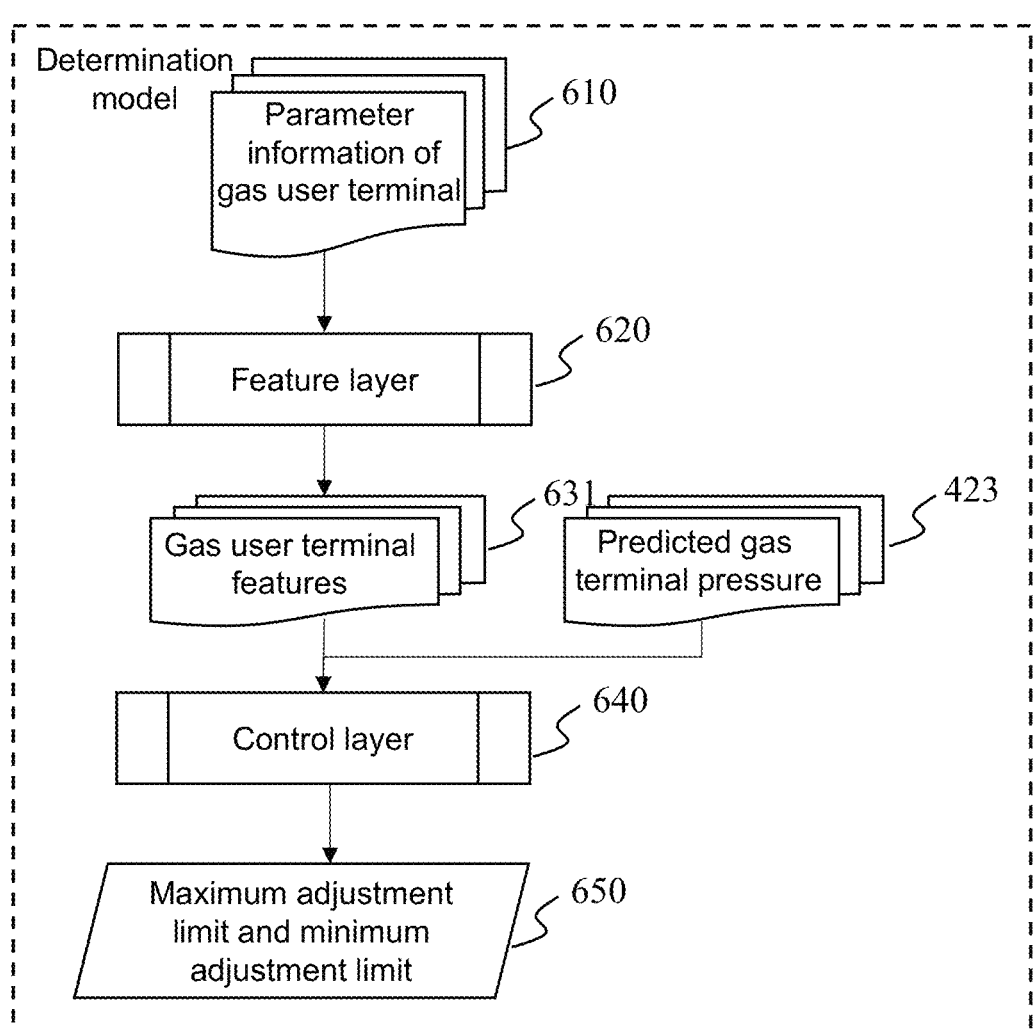
FIG. 6 is an exemplary schematic diagram of a determination model according to some embodiments of the present disclosure.

In some embodiments, the smart gas equipment management platform may determine the maximum adjustment limit and the minimum adjustment limit based on the processing of the parameter information of the gas user terminal and the predicted gas terminal pressure by the determination model. FIG. 6 is an exemplary schematic diagram of determining the preset parameter range according to some embodiments of the present disclosure.

For more contents about the parameter information of the gas user terminal, please refer to FIG. 4 and related description thereof, and for more contents about the predicted gas terminal pressure, please refer to FIG. 3, FIG. 4 and related description thereof.

As shown in FIG. 6, the determination model 600 may comprise a feature layer 620 and a control layer 640. In some embodiments, the determination model 600 may process the parameter information 610 of the gas user terminal and the predicted gas terminal pressure 423 to determine the maximum adjustment limit and the minimum adjustment limit 650 of the preset parameter range. For more contents about the predicted gas terminal pressure 423, please refer to FIG. 4 and related description thereof.

In some embodiments, the feature layer 620 may process the parameter information 610 of the gas user terminal to determine gas user terminal features 631. As shown in FIG. 6, an input of the feature layer 620 may comprise the parameter information 610 of the gas user terminal, and an output of the feature layer 620 may comprise the gas user terminal features 631.

The gas user terminal features refer to features comprising the parameter information of the gas user terminal. The gas user terminal features may be represented by feature vectors. For example, the feature vectors (3, 400, 2, 85, 1.5) may represent that No. 3 pressure regulation station corresponds to 400 gas user terminals, and the type of the gas user terminals is the residential gas use terminal (assuming 2 represents the residential gas use terminal), the activity is 85% (if 85% of gas user terminals have recent use records), and the average daily gas consumption is 1.5 cubic meters.

In some embodiments, the control layer 640 may process the gas user terminal features 631 and the predicted gas terminal pressure 423 to determine the maximum adjustment limit and the minimum adjustment limit 650 of the preset parameter range. As shown in FIG. 6, the input of the control layer 640 may comprise the gas user terminal features 631 and the predicted gas terminal pressure 423, and the output of the control layer 640 may comprise the maximum adjustment limit and the minimum adjustment limits 650.

The determination model 600 may be obtained by jointly training the feature layer 620 and the control layer 640. The training samples may comprise the parameter information of the gas user terminal and the predicted gas terminal pressure in the historical data, and the tags of the training samples may comprise the maximum adjustment limit and the minimum adjustment limit. The parameter information of the gas user terminal of the training samples may be inputted into an initial feature layer, an output of the initial feature layer and the predicted gas terminal pressure of the training samples may be inputted into an initial control layer, a loss function may be constructed based on the output and the tags of the initial control layer, and the parameters of the initial feature layer and the initial control layer are iteratively updated based on the loss function until the preset condition is satisfied, the parameters in the feature layer and the control layer are determined, and the trained determination model is obtained. The preset condition may comprise, but is not limited to, loss function convergence, training period reaching a threshold, and the like.

In some embodiments of this disclosure, the preset parameter range is related to real-time gas pressure data. A relatively reasonable preset parameter range may be determined quickly and accurately by the determination model according to the current gas pressure and gas use conditions, the rationality and accuracy of gas pressure regulation may be improved, the gas use efficiency may be effectively improved, and the safety and stability of gas use by users may be ensured.

The basic concepts have been described above. Obviously, for technicians skilled in the art, the above detailed disclosure is merely an example, and does not constitute a limitation of the present disclosure. Although not explicitly described herein, various modifications, improvements, and corrections to this disclosure may occur to technicians skilled in the art. Such modifications, improvements, and corrections are suggested in this disclosure, so such modifications, improvements, and corrections still belong to the spirit and scope of the exemplary embodiments of this disclosure.

Meanwhile, the present disclosure uses specific words to describe the embodiments of the present disclosure. Examples such as "one embodiment," "an embodiment," and/or "some embodiments" mean a certain feature, structure, or characteristic associated with at least one embodiment of this disclosure. Therefore, it should be emphasized and noted that two or more references to "an embodiment" or "one embodiment" or "an alternative embodiment" in various places in this disclosure are not necessarily referring to the same embodiment. Furthermore, certain features, structures or characteristics of the one or more embodiments of this disclosure may be combined as appropriate.

Furthermore, unless explicitly stated in the claims, the order of processing elements and sequences described in this disclosure, the use of alphanumerics, or the use of other names is not intended to limit the order of the processes and methods of this disclosure. While the foregoing disclosure discusses by way of various examples some embodiments of the disclosure that are presently believed to be useful, it is to be understood that such details are for purposes of illustration only and that the appended claims are not limited to the disclosed embodiments, instead, the claims are intended to cover all modifications and equivalent combinations falling within the spirit and scope of the embodiments of this disclosure. For example, although the system components described above may be implemented by hardware devices, they may also be implemented by software-only solutions, such as installing the described systems on existing servers or mobile devices.

Similarly, it should be noted that, in order to simplify the expressions disclosed in this disclosure and thus help the understanding of one or more embodiments of the disclosure, in the foregoing description of the embodiments of this disclosure, various features may sometimes be combined into one embodiment, in the drawings or descriptions thereof. However, this method of disclosure does not imply that the subject matter of the disclosure requires more features than are recited in the claims. Rather, claimed subject matter may lie in less than all features of a single foregoing disclosed embodiment.

Some examples use numbers to describe quantities of ingredients and attributes, it should be understood that such numbers used to describe the examples, in some examples, use the modifiers "about", "approximately" or "substantially" to retouch. Unless stated otherwise, "about", "approximately" or "substantially" means that a variation of +20% is allowed for the stated number. Accordingly, in some embodiments, the numerical parameters set forth in the disclosure and claims are approximations that may vary depending upon the desired characteristics of individual embodiments. In some embodiments, the numerical parameters should consider the specified significant digits and use a general digit retention method. Notwithstanding that the numerical fields and parameters used in some embodiments of this disclosure to confirm the breadth of their ranges are approximations, in specific embodiments such numerical values are set as precisely as practicable.

For each patent, patent application, patent application publication, and other material, such as an article, a book, a specification, a publication, a document, etc., cited in this disclosure, the entire contents of which are hereby incorporated into this disclosure by reference. Application history documents that are inconsistent with or conflict with the contents of this disclosure are excluded, as are documents (currently or hereafter appended to this disclosure) limiting the broadest scope of the claims of this disclosure. It should be noted that, if there is any inconsistency or conflict between the descriptions, definitions and/or use of terms in the accompanying materials of this disclosure and the contents of this disclosure, the descriptions, definitions and/or use of terms in this disclosure shall prevail.

Finally, it should be understood that the embodiments described in this disclosure are only used to illustrate the principles of the embodiments of this disclosure. Other variations are also possible within the scope of this disclosure. Therefore, by way of example and not limitation, alternative configurations of the embodiments of this disclosure may be considered consistent with the instructions of this disclosure. Accordingly, the embodiments of this disclosure are not limited to the embodiments expressly introduced and described in this disclosure.

What is claimed is:

1. An Internet of Things system for smart gas adaptive pressure regulation, comprising: a smart gas user platform, a smart gas service platform, a smart gas equipment management platform, a smart gas sensor network platform, and a smart gas object platform; wherein the smart gas object platform is configured to obtain calorific value data of gas and a first pressure regulation parameter of a pressure regulation station, and transmit the calorific value data of gas and the first pressure regulation parameter of the pressure regulation station to the smart gas equipment management platform through the smart gas sensor network platform; the first pressure regulation parameter is configured to reflect current pressure regulation data of the pressure regulation station;

the smart gas equipment management platform is configured to:

in response to the calorific value data of gas not satisfying a first preset condition, adjust the first pressure regulation parameter;

determine a second pressure regulation parameter of the pressure regulation station based on the adjusted first pressure regulation parameter, the second pressure regulation parameter being updated pressure regulation data; and send the updated pressure regulation data to the smart gas service platform;

the smart gas service platform is configured to send the updated pressure regulation data to the smart gas user platform.

2. The system of claim 1, wherein the smart gas user platform comprises a gas user sub-platform, a government user sub-platform, and a supervision user sub-platform;

the smart gas service platform comprises a smart gas use service sub-platform corresponding to the gas user sub-platform, a smart operation service sub-platform corresponding to the government user sub-platform, and a smart supervision service sub-platform corresponding to the supervision user sub-platform;

the smart gas equipment management platform comprises a smart gas indoor equipment parameter management sub-platform, a smart gas pipeline network equipment parameter management sub-platform, and a smart gas data center; the smart gas pipeline network equipment parameter management sub-platform comprises an equipment operation parameter monitoring and early warning module and an equipment parameter remote management module;

the smart gas sensor network platform comprises a smart gas indoor equipment sensor network sub-platform and a smart gas pipeline network equipment sensor network sub-platform;

the smart gas object platform comprises a smart gas indoor equipment object sub-platform and a smart gas pipeline network equipment object sub-platform.

3. The system of claim 1, wherein the smart gas equipment management platform is further configured to:

determine a predicted terminal pressure of a gas user terminal at least based on the first pressure regulation parameter of the pressure regulation station;

determine an adjustment value of the first pressure regulation parameter based on a difference between the predicted terminal pressure and a preset standard pressure; and adjust the first pressure regulation parameter based on the adjustment value.

4. The system of claim 3, wherein the smart gas equipment management platform is further configured to:

determine the predicted terminal pressure based on the processing of the first pressure regulation parameter and pipeline information of a gas pipeline connected to the pressure regulation station by a pressure prediction model, the pressure prediction model being a machine learning model.

5. The system of claim 4, wherein the smart gas equipment management platform is further configured to:

build a site diagram structure based on the pressure regulation station, the first pressure regulation parameter, and the pipeline information;

at least part of the nodes of the site diagram structure corresponding to the pressure regulation station, the edges of the site diagram structure corresponding to the gas pipeline, the directions of the edges corresponding to a gas flow direction, attributes of each node comprising an incoming gas pressure and an outgoing gas pressure of the pressure regulation station, and attributes of each edge comprising a gas pressure loss in a gas pipeline corresponding to the edge; and output the predicted terminal pressure based on the at least part of the nodes of the site diagram structure by processing the site diagram structure using the pressure prediction model.

6. The system of claim 5, wherein the nodes of the site diagram structure comprise an end node, the pressure regulation station corresponding to the end node is directly connected to the gas user terminal; attributes of the end node further comprise parameter information of the corresponding gas user terminal;

the predicted terminal pressure is obtained based on an output of the end node.

7. The system of claim 5, wherein the smart gas equipment management platform is further configured to:

determine a gas efficiency evaluation score based on the calorific value data of gas and the predicted terminal pressure; and perform at least one round of iterative updating of the first pressure regulation parameter through a preset algorithm based on the gas efficiency evaluation score and the site diagram structure to determine the adjustment value of the first pressure regulation parameter.

8. The system of claim 1, wherein the smart gas equipment management platform is further configured to:

determine whether the second pressure regulation parameter satisfies a second preset condition;

in response to the second pressure regulation parameter not satisfying the second preset condition, determine a final pressure regulation parameter based on the second pressure regulation parameter; and send the final pressure regulation parameters to a user and receive feedback from the user.

9. The system of claim 8, wherein the second preset condition comprises that:

the second pressure regulation parameter is within a preset parameter range; and the preset parameter range being related to the gas user terminal.

* * * * *